March 1, 1955  W. D. NELSON  2,703,149
HYDRAULIC POWER STEERING MECHANISM
Filed March 5, 1953  3 Sheets-Sheet 1
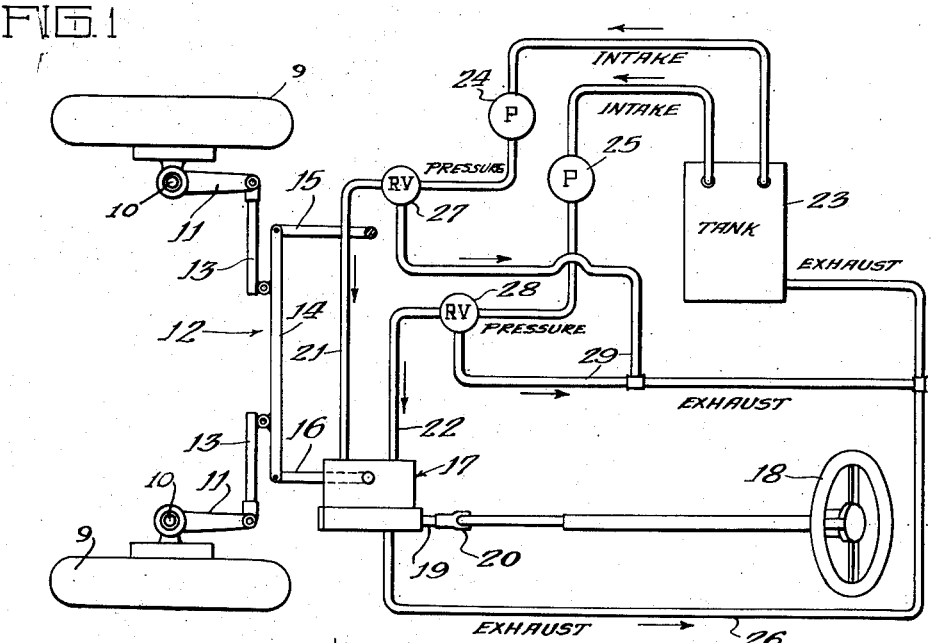
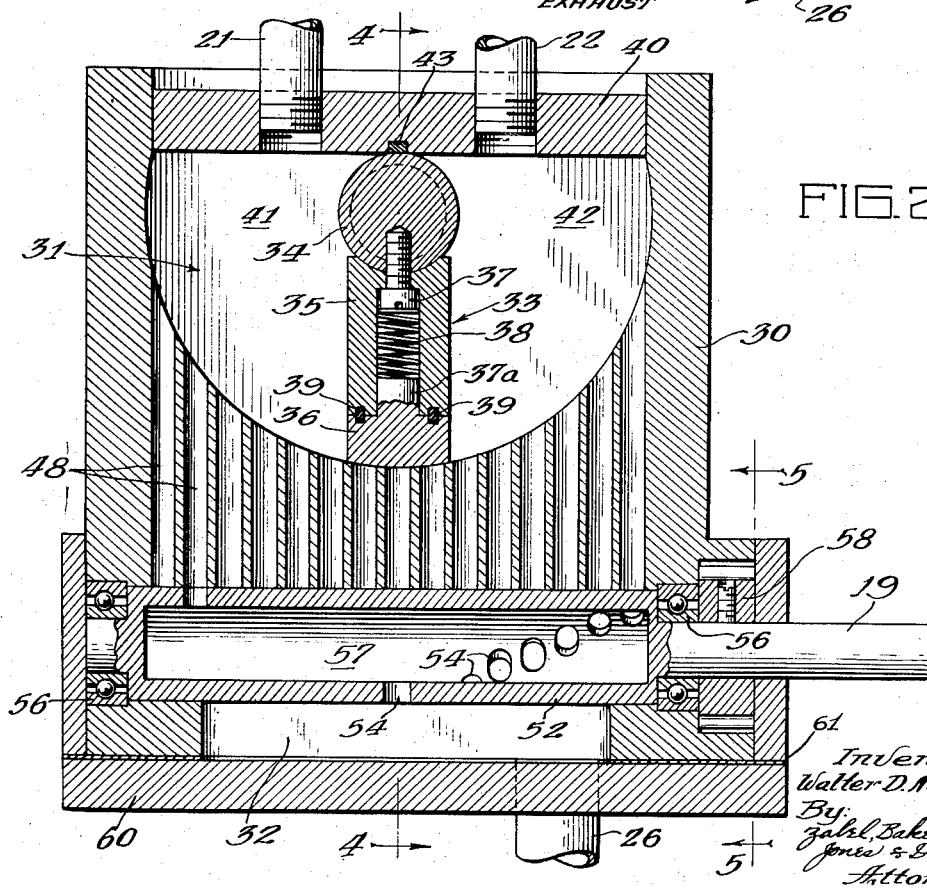
Inventor:
Walter D. Nelson
By:
Zabel, Baker, York,
Jones & Dithmar
Attorneys

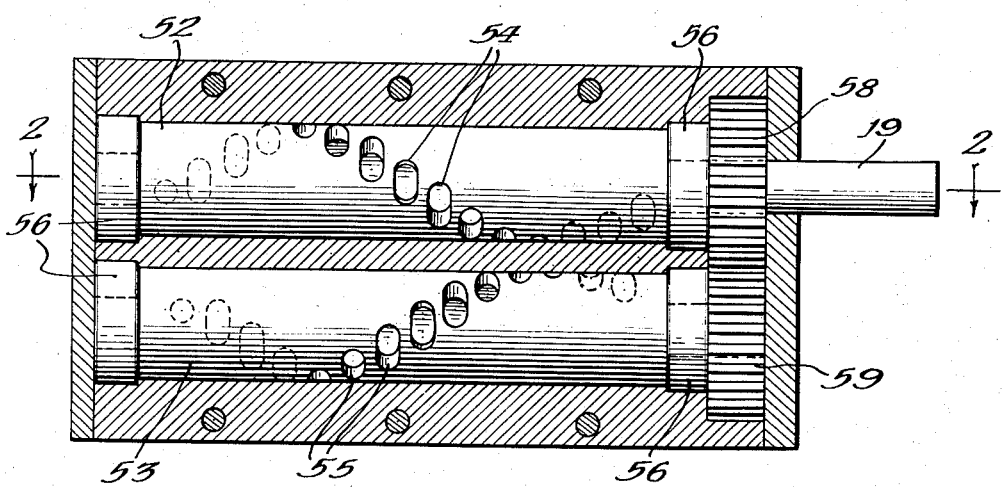
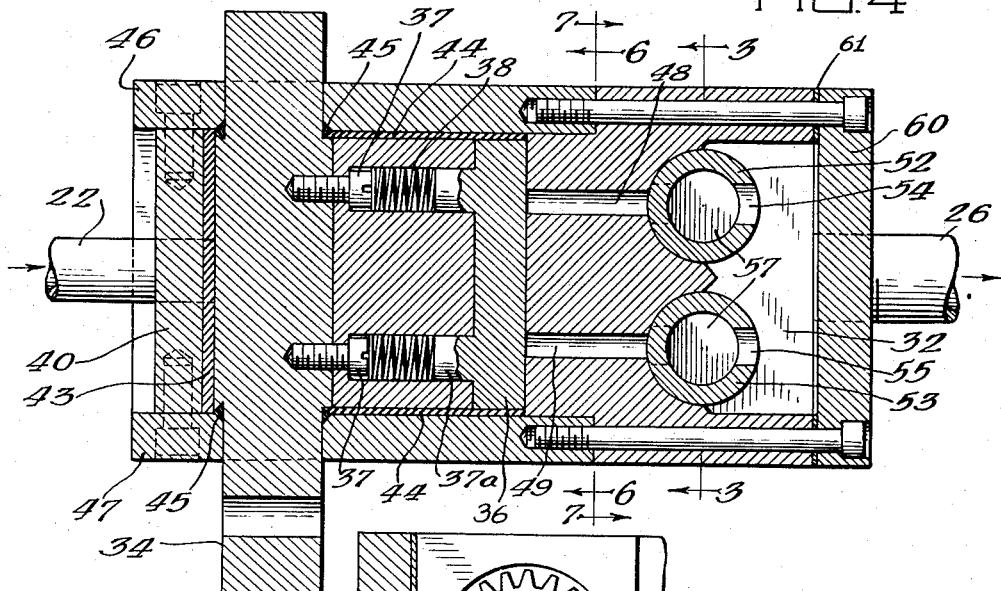
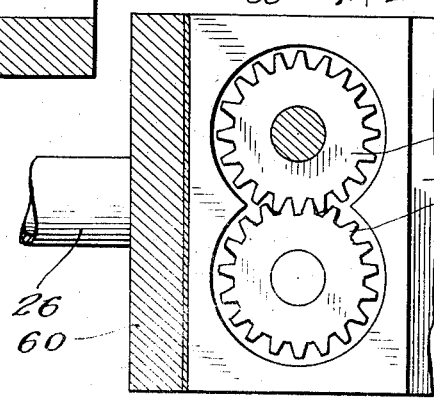

March 1, 1955 W. D. NELSON 2,703,149
HYDRAULIC POWER STEERING MECHANISM
Filed March 5, 1953 3 Sheets-Sheet 3
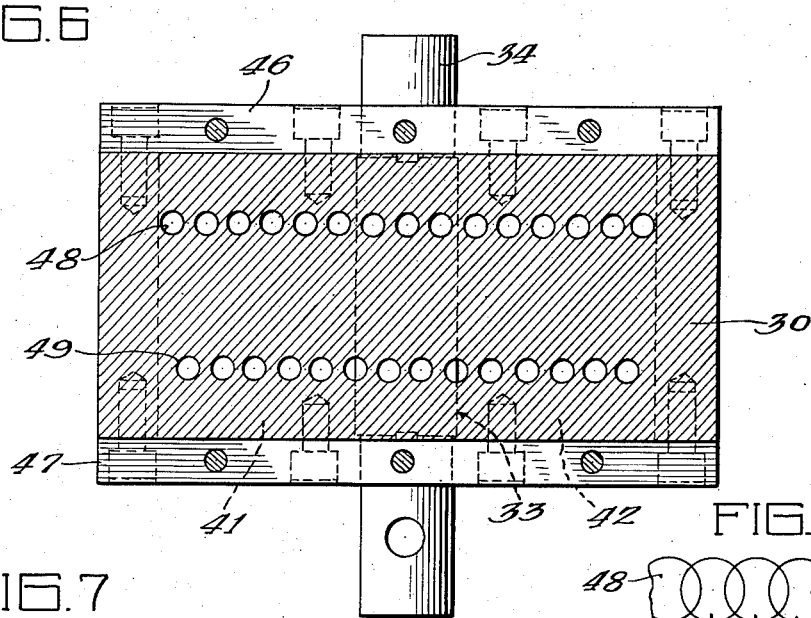
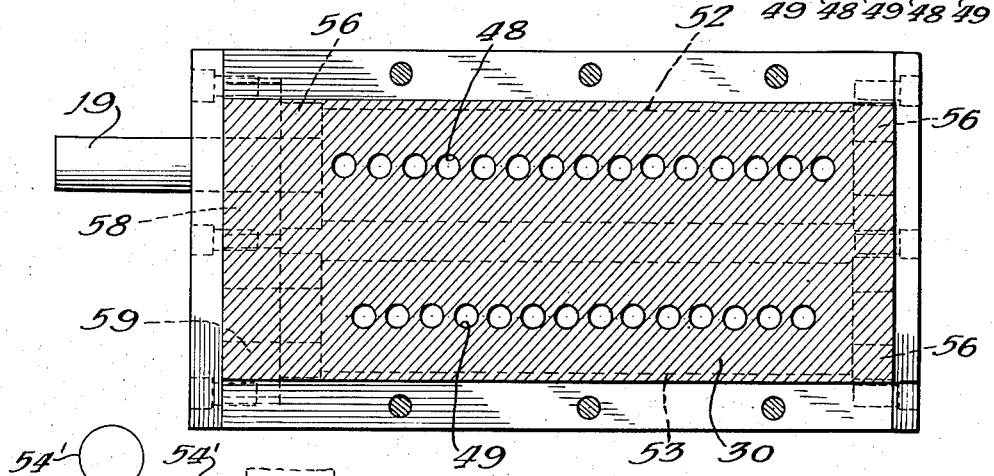
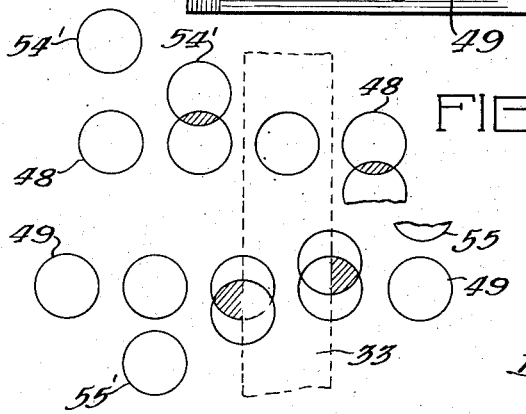
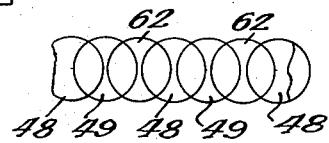
Inventor:
Walter D. Nelson

United States Patent Office 2,703,149
Patented Mar. 1, 1955

2,703,149

HYDRAULIC POWER STEERING MECHANISM

Walter D. Nelson, Chicago, Ill.

Application March 5, 1953, Serial No. 340,458

9 Claims. (Cl. 180—79.2)

This invention relates to power steering mechanism, and more particularly to an improved hydraulic actuator for use under conditions where a high degree of responsiveness and sensitivity is desired, such as in the steering and braking of vehicles.

One object of the present invention is to provide an improved power steering mechanism which requires no substantial change in the steering linkages presently used.

According to present practice, the steering force is applied to knuckle arms which are secured to the knuckles which carry the front wheel spindles, and these two knuckle arm levers are connected by a composite link which is mounted for lateral movement. The composite link, in turn, is actuated by a pivotally mounted arm, or pitman, which is supported from the sprung portion of the vehicle, and which constitutes the output of the usual worm and sector or other mechanical steering gear.

According to the present invention, I have provided a hydraulic actuator, the output element of which is a pitman which is adapted to be connected to the composite link and which cooperates therewith in the same manner as the pitman which is associated with the aforesaid mechanical gear.

Another object of the present invention is to provide a power steering mechanism having improved responsiveness and sensitivity and which is irreversible in action. In this connection, a hydraulic actuator is provided in which the steering force is proportional to the rapidity with which the steering wheel is operated. Thus, it is possible to provide a steering mechanism in which there is little or no lag, even though the steering wheel is moved to a substantial extent. Furthermore, where the wheel is moved to only a slight extent, the present invention provides means for producing a corresponding movement of the front wheels.

A still further object is to provide an improved steering mechanism which is characterized by complete absence of lost motion and over-steering, and which is also characterized by improved "road feel".

Still another object is to provide an improved hydraulic actuator of compact and relatively simple construction which, due to its sensitivity and responsiveness, is suitable for use in connection with the steering and braking of vehicles.

A further object is to provide an improved valve mechanism which provides a continuous open port area to the end that any movement in the valve will result in a corresponding movement of the piston.

Still another object is to provide an improved means for mounting the valves in the cylinder block so as to permit easy operation under exceedingly high hydraulic pressures.

Other objects, features and advantages will become apparent as the description proceeds.

With reference now to the drawings in which like reference numerals designate like parts:

Fig. 1 is a diagrammatic illustration of a preferred embodiment of my invention;

Fig. 2 is a plan section through the actuator taken along line 2—2 of Fig. 3;

Fig. 3 is a vertical section taken along line 3—3 of Fig. 4;

Fig. 4 is a vertical section taken along line 4—4 of Fig. 2;

Fig. 5 is a vertical section taken along line 5—5 of Fig. 2;

Fig. 6 is a section taken along line 6—6 of Fig. 4;

Fig. 7 is a vertical section taken along line 7—7 of Fig. 4; and

Fig. 8 is a diagrammatic representation of the arrangement of the ports and the piston;

Fig. 9 is a diagram illustrating the effective overlap of the two rows of passageways in order to provide a continuous port area; and Fig. 10 is a diagram similar to Fig. 9 but showing the effective overlap provided by three rows of passageways.

With reference now to Fig. 1, the reference numerals 9 designate the front wheels of an automobile, the spindles of which are pivotally supported by a front axle, not shown, on king pins 10. The positions of the spindles are controlled by knuckle arms 11 which may be formed integrally with or otherwise connected to the spindles. The levers 11 are connected together by a composite link 12 which comprises the rods 13 which are pivotally connected at their inner ends to a drag link 14 in a manner which permits relative vertical motion between the two since the drag link 14 is supported from the sprung portion of the vehicle. At one end, the drag link is supported by an idler link 15, whereas at the other end, it is supported by a pitman 16 which constitutes the output element of a hydraulic actuator 17.

The operation of the actuator 17 is controlled by a steering wheel 18 which is connected to an input shaft 19 by means of a suitable coupling 20, such as a universal joint.

The hydraulic connections are also shown in Fig. 1 and comprise two pressure lines 21 and 22 which extend from a tank 23 to the actuator 17. Pumps 24 and 25 are interposed in each of the lines 21 and 22 to produce a relatively high operating pressure. These pumps may be powered from the fan belt or from any other rotating part of the engine. An exhaust line 26 leads from the actuator 17 back to the tank 23. Suitable relief valves 27 and 28 are interposed in the lines 21 and 22, and communicate with the tank 23 through suitable conduits 29.

The actuator 17 is in the form of a cylinder block 30 which is provided with a cylinder cavity 31 and a valve cavity 32. The cylinder cavity 31 is in the form of a segment or portion of a cylinder. Disposed within the cavity 31 is a piston 33 which is in the form of a vane secured to a shaft 34.

The vane comprises a vane member 35 and a seal member 36, as shown in Fig. 2. The vane member is provided with bores to accommodate screws 37 by means of which it may be secured to the shaft 34. The seal member 36 is provided with pins or cylindrical extensions 37a which extend into the bore so as to permit relative sliding movement. Springs 38 disposed within the bores urge the seal member 36 outwardly against the wall of cavity 32 and in sealing engagement therewith. Suitable neoprene sealing strips 39 may be provided to seal any gap between the elements 35 and 36.

The cylinder cavity 31 is closed by a closure plate 40 in which are mounted the pressure lines 21 and 22. As shown in Figs. 2 and 4, the arrangement is such that the piston 33 seals off the cavity 31 into two parts, 41 and 42, to the end that the pressure difference between these two parts will cause movement of the piston 33 one way or the other. The seal between these two halves is additionally maintained by a sealing strip 43, mounted in a groove in the cover plate 40 and bearing against a shaft 34, and by sealing strips 44 which are mounted in grooves at the upper and lower edges of the piston 33. Ring seals 45 are also provided to prevent leakage between the shaft, and the top and bottom plates 46 and 47, respectively.

The type of cylinder and piston above described can be referred to herein as a "butterfly" type of actuator having a butterfly cylinder and a butterfly piston. The term "length" as used with respect to, the butterfly cylinder refers to that dimension which is parallel to the plane of the closure plate 40.

The pressure within the cylinder cavity 31 is regulated by port means comprising two or more sets of passageways and valve ports which are arranged along the length of the cylinder.

The block 30 is provided with two rows of passageways, an upper row 48 and a lower row 49, which extend from the cylinder cavity 31 to the valve cavity 32. The relationship of these passageways is shown in Fig. 6; the passageways of one row are staggered with respect to the passageways of the other row, and the distance between adjacent passageways in the same row is less than the diameter of each passageway. Thus, the port area provided by one row overlaps, at all points, the port area provided by the other row, to provide which is referred to herein as a "continuous port area"; that is, a port area which is continuous with respect to the length of the cylinder cavity 31.

Valve ports are provided to selectively uncover or open a group of adjacent passageways in each row in order to provide a continuous open port area which is of a width greater than the width of the piston 33. By shifting the open port area toward one end of the cylinder or the other, the vane will be caused to follow the shift in the open port area, in a manner to be pointed out hereinafter.

The opening or uncovering of certain of the ports is accomplished by the mechanism contained in the valve cavity 32 of the block 30, and which includes two rotatable sleeve valves 52 and 53 which, as shown in Fig. 3, are each provided with a row of spirally arranged valve ports 54 and 55, respectively. The ports 54 and 55 are preferably of elongate shape, corresponding in width to the diameter of the passageways 48 and 49, respectively, but being of somewhat greater height.

The sleeve valves 52 and 53, respectively, are journaled at both ends in ball bearing units 56 which are set into the cylinder block 30 to the end that the two sleeves may be easily rotated in spite of the relatively high hydraulic pressure exerted thereon in a radial direction.

The valve cavity 32 is shaped so that one wall is in the form of two half cylinders of the same diameter as the sleeve valves. Thus, the sleeve valves fit closely against the openings provided by the passageways.

As shown in Figs. 3 and 5, each sleeve is provided with a gear 58 and 59, respectively, which mesh with each other to the end that the sleeves may be rotated in synchronism with each other to an equal angular extent. The input shaft 19 is suitably secured to or forms an extension of one of the sleeves.

The operation of the valve mechanism and of the butterfly actuator is best described by reference to the diagram of Fig. 8 which shows a development of spirally arranged circular ports 54′ and 55′ overlying the passageways 48 and 49, respectively. An overlapping of the respective pairs 48—54′, or 49—55′, indicates an uncovering or opening of the passageways 48 and 49 to provide a continuous open port area. The dotted lines represent the width of the piston 33 which serves to block all of the uncovered passageways, except for those portions which are shown by cross hatching and which may be referred to as the exposed open port area or the discharge area. In other words, the discharge area for each cylinder part 41, 42 is determined by the amount of open port area which is exposed by the piston. Fig. 8 shows the parts in a neutral position, in which the discharge area on the left side of the piston 33 is equal to the discharge area on the right side.

Assuming that the pumps 26 and 27 each provide equal delivery at equal pressures, the pressures within each part 41, 42 of the butterfly cylinder cavity 31 will be determined by the discharge area provided for each part. If the discharge areas of each part 41, 42 are equal, then the pressure in each part will be equal, with the result that the pressure on each side of the piston is equal, so that the piston 33 will remain in a stable and stationary position.

If, on the other hand, the sleeves are rotated so that the discharge area on one side of the piston is greater than the discharge area on the other side, then the pressure in that cylinder part having the greater discharge area will drop, as the pressure in the other cylinder part increases, with the result that the piston 33 will be displaced in the direction of the cylinder part having the lower pressure.

The steering action provided by the present invention is irreversible since the butterfly piston is maintained in a given position by the pressure equilibrium.

The hollow interior of the sleeve valves 52 and 53 provides an outlet manifold 57.

In this connection, it will be observed that each of the series of ports 54 and 55 is arranged through more than 180° of helix, to the end that there are a plurality of ports disposed between the manifold 57 and the valve cavity 32.

A cover plate 60, and suitable gasket 61 is provided for the valve cavity 32. As shown in Fig. 2, the exhaust line 26 takes into cover plate 60 and communicates with the valve cavity 32 at this point.

Fig. 9 shows the overlapping or staggering of the passageways of the two series 48 and 49. Thus, there is a continuity of open port area, as illustrated diagrammatically. In other words, there can be no position of the piston which corresponds to more than one position of the sleeve valves, thereby providing an infinite number of piston positions which correspond to an infinite number of valve positions.

Fig. 10 shows diagrammatically the overlap which can be provided when three series of passageways 48, 49 and 62 and three sleeve valves are provided. In like manner, an even greater number of series of passageways and sleeve valves may be provided to the end that the continuous port area provided by the overlap will be of more uniform effective height.

Furthermore, as shown in Fig. 2, the openings defined by the intersection of the bores or passageways 48 and 49 becomes more elongate, and the openings are spaced farther apart as one approaches either end of the cylinder. This provides a variable input to output ratio which increases as one approaches the ends of the cylinder and conversely provides greater sensitivity at the central portion of the cylinder which corersponds to the piston position in Fig. 2.

However, with the present construction, other variable ratios may be provided merely by the expedient of shifting the pitch angle of the helix at its central portion, with respect to its end portions.

It will be observed when the input shaft 19 is suddenly rotated through a substantial extent, the open port area will be shifted entirely beyond the piston. In this situation, the entirely exposed open port area will constitute the discharge area for one part, say part 41, and part 42 will have no discharge area. Therefore, the pressure in part 41 will drop very suddenly and the full pressure of the pump 22 will be applied to part 42. Thus a much greater pressure differential will occur than when the input shaft 19 is rotated slowly, with the result that the steering force is roughly proportional to the rapidity with which the steering wheel 18 is turned.

In the diagram of Fig. 8 it will be observed that the ports 54′, 55′ are circular, whereas the valve ports 54 and 55 as shown in Figs. 2 and 3 are elongate. The effect of increasing the length of these ports is to increase the open port area for a given pitch angle of the helix and for a given spacing between the passageways or ports.

The term "length" as applied to the cylinder, refers to that direction which is perpendicular to the axis of the cylinder cavity 31 and the shaft 34, and which is parallel to the plane of the cover plate 40. Thus, the axes of the sleeve valves 52 and 53 are parallel to the length of the cylinder, and the rows of passageways 48 and 49 are oriented parallel to the length of the cylinder.

The operation has been described in detail in connection with the description of the various parts.

To summarize the operation, movement of the steering wheel 18 will cause correspo..ding movement of the sleeve valves 52 and 53, which results in a shifting of the discharge area for the cylinder parts 41 and 42. The piston 33 will follow the shift in the open port area, and the movement of the piston is transmitted, through pitman 16 and composite link 12 to the knuckle arms 11 and front wheels 9.

Once the parts have reached a condition of equilibrium, the equal pressure on both sides of the piston will cause the front wheels to be held in a given position. The steering action is not reversible for the reason that any tendency of the piston to move by virtue of a force applied to the front wheels, cannot possibly cause rotation of the sleeve valves.

On the other hand, the relief valves 27, 28 serve to avoid the development of dangerous pressures in situations comparable to that in which the front wheels are blocked against motion, by the curb, when the car is parked.

Although the only coupling between the steering wheel and the front wheels is the coupling provided by the hydraulic actuator, it is contemplated that a suitable bypass mechanical coupling can be provided, if desired, to permit steering when the motor is not operating. However, in such a situation, it is desirable to provide a lost motion connection in such mechanical coupling so as to maintain the irreversibility of action.

By providing a plurality of series of passageways and a plurality of sleeve valves, it is possible to provide a continuous open port area to the end that any motion of the steering wheel will result in a corresponding motion of the front wheels. Furthermore, by disposing the sleeve valves in an open valve cavity, and by journaling the sleeve valves in their ends, I am enabled to utilize extremely high hydraulic pressures, as contrasted with a construction in which the sleeve valve is entirely surrounded by the cylinder block, in which event the pressure of the hydraulic fluid would cause binding of the sleeve valves in their respective bores.

If desired, the cylinder block 30 may be made in two separate portions, the dividing line between the said two portions being taken substantially along the section lines 6—6 of Fig. 4.

Although I have shown and described herein only a preferred embodiment of my invention, it is understood that various changes and modifications may be made therein without departing from the spirit of my invention as pointed out in the appended claims.

I claim:

1. A hydraulic actuator comprising a cylinder block providing a butterfly cylinder cavity and a valve cavity, a butterfly piston in the form of a vane disposed within said cylinder cavity, a shaft journaled with respect to said cylinder block and extending centrally through said butterfly cylinder cavity, said shaft being actuated by said piston, a plurality of series of passageways providing communication between said cylinder cavity and said valve cavity, a plurality of rotatable sleeve valves disposed within said valve cavity, each sleeve valve having a helically arranged row of ports spaced so as to permit selective registration of a port with its corresponding passageway as said sleeve is rotated, and so as to permit a partial uncovering of adjacent passageways by adjacent ports so as to provide an open port area which is shiftable with respect to the length of said butterfly cylinder, the passageways of each of said series being staggered with respect to the passageways of the remaining series so that said open port area will be continuous throughout a distance greater than the width of said piston.

2. A power steering device as claimed in claim 1 in which said sleeve valves are hollow and provide a manifold chamber, and in which said cylinder block is relieved rearwardly of said sleeve valves so that said valve cavity extends beyond said sleeve valves and exposes the rear portions thereof, the ports in said sleeve velves being arranged throughout more than 180 degrees so that there will be, in any angular position of a sleeve valve, a plurality of ports disposed between said manifold chamber and said valve cavity to provide communication therebetween.

3. A power steering device as claimed in claim 1 in combination with an automobile having pivotally mounted knuckles and knuckle arms, a pitman secured to said shaft, and link means connecting one of said knuckle arms with said pitman whereby the pivotal motion of said butterfly piston will be communicated to said knuckle arm.

4. A hydraulic actuator comprising a cylinder block providing a butterfly cylinder cavity and a valve cavity, a butterfly piston disposed within said cylinder cavity, an output shaft journaled with respect to said cylinder block and extending centrally through said butterfly cylinder cavity, said shaft being actuated by said piston, two series of passageways providing communication between said cylinder cavity and said valve cavity, two rotatable sleeve valves disposed within said valve cavity, each sleeve valve having a helically arranged row of ports spaced so as to permit selective registration of a port with its corresponding passageway as said sleeve is rotated, and so as to permit a partial uncovering of adjacent passageways by adjacent ports thereby providing an open port area which is shiftable with respect to the length of said butterfly cylinder, the passageways of one of said series being staggered with respect to the passageways of the other of said series so that said open port area will be continuous throughout a distance greater than the width of said piston, and input means for rotating said sleeve valves in synchronism with each other.

5. A hydraulic actuator as claimed in claim 4 in which said input means comprises a pair of gears meshing with each other, one gear being secured to each sleeve valve, and an input shaft secured to one of said sleeve valves.

6. A hydraulic actuator as claimed in claim 4 in which the openings defined by the intersection of said passageways with the concave wall of said cylinder cavity become increasingly elongate toward the ends of said cylinder in order to provide a higher ratio of output to input toward the ends of said cylinder than in the middle thereof.

7. Valve means for a hydraulic actuator of the type including a cylinder block providing a cylinder cavity, a piston disposed in said cylinder cavity, and means for supplying fluid under pressure to both ends of said cylinder, said valve means including a plurality of hollow cylindrical valve members disposed parallel to each other and along the length of said cylinder, a series of helically arranged valve ports in each of said valve members, the spacing in the axial direction between the ports of each series being less than the width of said ports, and the ports of each series being staggered with respect to the ports of other series to provide an effective overlapping in the axial direction of the port area provided by said plurality of series of ports, a plurality of series of passageways, one for each of said valve members, extending through said cylinder block from each of said valve members to said cylindrical cavity, said passageways being aligned with each other, and being individually aligned with each of said valve ports so as to register selectively with a plurality of adjacent valve ports as said valve members are rotated to provide a continuous open port area which is shiftable in the direction of the length of said cylinder as said valve members are rotated, the width of said continuous open port area being greater than the width of said piston so as to provide when in condition of equilibrium, an exposed open port area on either side of said piston, thus forming a separate discharge area for each part of said cylinder cavity whereby a shifting of said open port area will increase the discharge area at one end of said cylinder cavity and will decrease the discharge area at the other end of said cylinder cavity to cause a decrease of fluid pressure in the former and a decrease of fluid pressure in the latter end, thereby causing said piston to move toward a position of equilibrium in which said discharge areas are of equal area.

8. In a device of the class described comprising a cylinder block providing a cylinder cavity and a valve cavity, and a row of passageways connecting the two, valve means comprising a sleeve valve disposed within said valve cavity and in contact with the forward wall thereof and journalled in said cylinder block, said forward wall of said valve cavity being of a shape which complements the shape of said sleeve valve in order that a seal may be provided for said row of passageways which open into said cylindrically shaped front wall, said valve cavity exposing the rear portion of said sleeve valve, a series of helically arranged ports in said sleeve valve for selective registration with said passageways as said sleeve valve is rotated to provide communication between said cylinder cavity and the interior of said sleeve valve, said ports extending through more than 180° of helix so that some of said ports provide communication between the interior of said sleeve valve and said valve cavity.

9. In a device of the class described comprising a cylinder block providing a cylinder cavity and a valve cavity, and a row of passageways connecting the two, valve means comprising a sleeve valve disposed within said valve cavity and in contact with the forward wall thereof, ball bearing units disposed at the ends of said sleeve valve for journaling said sleeve valve in said cylinder block, said forward wall of said valve cavity being formed in the shape of a half cylinder of the same diameter as the diameter of said sleeve valve in order that a seal may be provided for said row of passageways which open into said cylindrically shaped front wall, said valve cavity exposing the rear half of said sleeve valve, a series of helically arranged ports in said sleeve valve for selective registration with said passageways as said sleeve valve is rotated to provide communication between said cylinder cavity and the interior of said sleeve valve, said ports extending through more than 180° of helix so that some of said ports provide communication between the interior of said sleeve valve and said valve cavity.

References Cited in the file of this patent

UNITED STATES PATENTS

| | | |
|---|---|---|
| 1,116,975 | Bergesen | Nov. 10, 1914 |
| 1,897,075 | Samson | Feb. 14, 1933 |
| 2,072,203 | Fuller | Mar. 2, 1937 |
| 2,230,361 | Morin et al. | Feb. 4, 1941 |
| 2,250,393 | Rado | July 22, 1941 |
| 2,334,328 | Hvid | Nov. 16, 1943 |

FOREIGN PATENTS

| | | |
|---|---|---|
| 567,506 | Germany | Apr. 20, 1933 |